(12) United States Patent
Campanelli et al.

(10) Patent No.: US 9,785,627 B2
(45) Date of Patent: Oct. 10, 2017

(54) AUTOMATED FORM FILL-IN VIA FORM RETRIEVAL

(71) Applicant: Xerox Corporation, Norwalk, CT (US)

(72) Inventors: Michael Robert Campanelli, Webster, NY (US); Reiner Eschbach, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 172 days.

(21) Appl. No.: 14/162,179

(22) Filed: Jan. 23, 2014

(65) Prior Publication Data

US 2015/0205777 A1   Jul. 23, 2015

(51) Int. Cl.
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |
| G06K 9/00 | (2006.01) |

(52) U.S. Cl.
CPC ....... *G06F 17/243* (2013.01); *G06K 9/00449* (2013.01); *G06K 9/00483* (2013.01)

(58) Field of Classification Search
CPC .......................... G06F 17/243; G06K 9/00442
USPC ........................................................ 715/226
See application file for complete search history.

(56) References Cited

U.S. PATENT DOCUMENTS

| 6,396,951 | B1 | 5/2002 | Grefenstette | |
| 6,868,411 | B2* | 3/2005 | Shanahan | G06F 17/30707 706/12 |
| 7,971,137 | B2* | 6/2011 | Jindal | G06F 17/30867 715/234 |
| 2009/0232398 | A1* | 9/2009 | Martin | G06F 17/243 382/187 |
| 2011/0271173 | A1* | 11/2011 | Ait-Mokhtar | G06F 17/243 715/226 |
| 2014/0118560 | A1 | 5/2014 | Bala et al. | |
| 2014/0122988 | A1* | 5/2014 | Eigner | H04L 67/30 715/226 |
| 2014/0237342 | A1* | 8/2014 | King | G06F 17/30876 715/224 |
| 2015/0054975 | A1 | 2/2015 | Emmett et al. | |

FOREIGN PATENT DOCUMENTS

| EP | 0585074 A2 | 3/1994 |
| EP | 1887478 A1 | 2/2008 |

* cited by examiner

*Primary Examiner* — Manglesh M Patel
*Assistant Examiner* — Nicholas Hasty
(74) *Attorney, Agent, or Firm* — Fox Rothschild LLP

(57) ABSTRACT

A method of creating an electronic file corresponding to a printed artifact may include receiving an image file of a document page. The method may include analyzing the image file to detect a potential form identifier on the document page and automatically (without human intervention) performing a search to identify an actual form that corresponds to the potential form identifier. The method may further include validating that the image file is of a document page that corresponds to the actual form, locating a probable fill-in field on the document page and mapping the probable fill-in field to an actual fill-in field of the actual form.

22 Claims, 10 Drawing Sheets

SECTION 2: IDENTIFYING INFORMATION

A. Personal Information: Your name, date of birth, and social security number must coincide with the information on your social security record.

| First Name | Middle Initial | Last Name | Jr., Sr., M.D., D.O., etc. |
|---|---|---|---|
| | | | |

| Other Name, First | Middle Initial | Last Name | Jr., Sr., M.D., D.O., etc. |
|---|---|---|---|
| | | | |

Type of Other Name
☐ Former or Maiden Name  ☐ Professional Name  ☐ Other *(Describe)*: _____

| Date of Birth *(mm/dd/yyyy)* | State of Birth | Country of Birth |
|---|---|---|
| | | |

| Gender ☐ Male ☐ Female | Social Security Number |
|---|---|
| | |

| Medical or other Professional School *(Training Institution, if non-MD)* | Year of Graduation *(yyyy)* | DEA Number *(if applicable)* |
|---|---|---|
| | | |

License Information
☐ License Not Applicable

| License Number | State Where Issued |
|---|---|
| | |

| Effective Date *(mm/dd/yyyy)* | Expiration/Renewal Date *(mm/dd/yyyy)* |
|---|---|
| | |

Certification Information
☐ Certification Not Applicable

| Certification Number | State Where Issued |
|---|---|
| | |

| Effective Date *(mm/dd/yyyy)* | Expiration/Renewal Date *(mm/dd/yyyy)* |
|---|---|
| | |

New Patient Status Information
Do you accept new Medicare patients?  ☐ Yes  ☐ No

B. Correspondence Address
Provide contact information for the person shown in Section 2A above. Once enrolled, the information provided below will be used by the fee-for-service contractor if it needs to contact you directly. This address cannot be a billing agency's address.

Mailing Address Line 1 *(Street Name and Number)*

Mailing Address Line 2 *(Suite, Room, etc.)*

| City/Town | State | ZIP Code + 4 |
|---|---|---|
| | | |

| Telephone Number | Fax Number *(if applicable)* | E-mail Address *(if applicable)* |
|---|---|---|
| | | |

CMS-855I (07/11)

AUTOMATED FORM FILL-IN VIA FORM RETRIEVAL

BACKGROUND

Countless situations exist in which people must fill out various forms in order to receive certain information or services. The forms may include department of motor vehicle forms, healthcare-related forms, employment applications, taxing authority forms and the like. While many applications have moved online, those that have moved online still require the user to manually enter the data into various fields. Manual filling of forms can tedious, especially on mobile electronic devices that have small display screens and limited keyboard entry capabilities.

One solution to automate form-filling that has been used in the non-mobile environment is to download software, such as a "wallet" or "form-filler", onto a user's device. The software may be installed as a plug-in on top of the user's browser software. A typical conventional form-filler operates by guessing at matches among fields in a form, which are to be filled-in, and corresponds with a wallet, which is a file that contains information that may be used to fill-in the form fields. However, for these systems to work properly, the electronic representation of the form must be perfectly clear so that the system can properly associate field descriptors and associate cached user information with the identified fields. Thus, the system must have a template of the form, or a user must identify the fields so that the system can assign them to a template.

This document describes devices and methods that are intended to address issues discussed above and/or other issues.

SUMMARY

In an embodiment, an electronic device containing a computer-readable medium and a processor creates an electronic file corresponding to a printed artifact. The method of creating the file includes receiving an image file of a printed form, optionally processing the image file to enhance an image in the file, analyzing the image file to detect a potential form identifier on the printed form, and automatically and without human intervention: (i) performing a search to identify an actual form that corresponds to the potential form identifier; and (ii) validating whether the image file is of a document page that corresponds to the actual form. Upon validating that the image file is of a document page that corresponds to the actual form, the device will locate a probable fill-in field on the document page, and it will map the probable fill-in field to an actual fill-in field of the actual form.

Optionally, the method also may include extracting information from the mapped fill-in field, determining a label for the actual fill-in field, and saving the extracted information in association with the label to a data file. Alternatively or in addition, if the method includes determining a label for the actual fill-in field, the method may include assigning the determined label to the probable fill-in field, and also optionally using the label to retrieve information to include in the probable fill-in field, adding the retrieved information to the probable fill-in field and saving the document page with the added information to a data file.

When detecting the potential form identifier, in some embodiments the device may analyze the document to locate a character string of a predetermined format, or it may analyze the document to locate a character string that is in a position of a probable form identifier location.

When validating whether the image file is of a document page that corresponds to the actual form, in some embodiments the device may use a form alignment algorithm to compare the actual form with the image file to generate a polynomial matching model, or it may perform image subtraction using the actual form and the image file to measure a number of difference pixels and yield a validation value. In embodiments where the device performs image subtraction using the actual form and the image file to measure a number of difference pixels and yield a validation value, it also may determine a validation value and compare the validation value against a threshold value.

If, when validating, the device determines that the image file is not of a document that corresponds to the actual form, the device may look for a second form by analyzing the image file to detect a second potential form identifier on the printed form. Then, automatically and without human intervention, the device may perform a search to identify a second actual form that corresponds to the potential form identifier, and it may validate that the image file is of a document page that corresponds to the second actual form. If so, then when performing the mapping, the device may map the probable fill-in field to an actual fill-in field of the second actual form.

BRIEF DESCRIPTION OF THE DRAWINGS

FIG. 5B depicts an example of an electronic image of a hard copy form retrieved according to an embodiment.

FIG. 7 illustrates an example of a form validation process using form alignment.

FIG. 8 depicts an example of a portion of an electronic form, with data fields and associated labels.

DETAILED DESCRIPTION

This disclosure is not limited to the particular systems, methodologies or protocols described, as these may vary. The terminology used in this description is for the purpose of describing the particular versions or embodiments only, and is not intended to limit the scope.

As used in this document, any word in singular form, along with the singular forms "a," "an" and "the," include the plural reference unless the context clearly dictates otherwise. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used herein, the term "comprising" means "including, but not limited to."

For the purposes of this document, a "form" refers to one or more printed artifacts containing a combination of text and/or images as well as blank fields that are to receive data. For example, a form may be a government-issued form such as a department of motor vehicle or taxing agency form, a healthcare-related form, an employment application, a financial account application, an educational institution application and the like.

A "mobile device" or "mobile electronic device" refers to a portable computing device that includes an image capturing device, a processor and non-transitory, computer-readable memory. The memory may contain programming instructions in the form of a software application that, when executed by the processor, causes the device to perform one or image acquisition and processing operations according to the programming instructions. Examples of suitable portable electronic devices include smartphones, personal digital assistants, cameras, tablet devices, electronic readers, personal computers, media players, satellite navigation devices and the like.

An "imaging device" refers to any device capable of optically viewing an object and converting an interpretation of that object into electronic signals. One such example of an imaging device is a camera. An "image capture module" refers to the software application and/or the image sensing hardware of an electronic device that is used to capture images.

This document describes a system by which a mobile electronic device will capture an image of a printed form, identify the form and recognize the form's data entry fields, and auto-fill at least some of those fields with available data.

Figure 1:
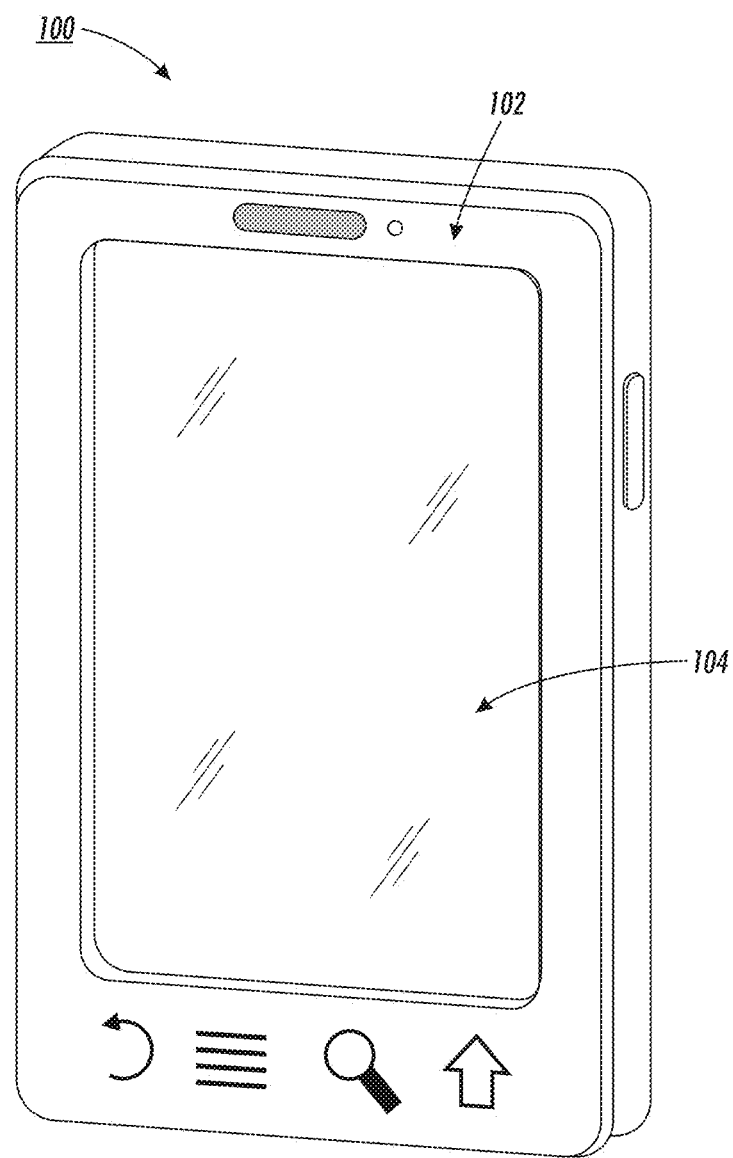
FIG. 1 depicts a first or front face of a mobile device that includes a camera configured to capture an image according to an embodiment.

FIG. 1 shows one example of a mobile device, generally designated 100. The mobile device 100 may include a front face 102 and a display 104. The display 104 may be any suitable component for displaying images, including, but not limited to, electroluminescent displays, electronic paper displays, vacuum fluorescent displays, light emitting diode (LED) displays, cathode ray tube (CRT) displays, liquid crystal (LCD) displays, plasma display panels, digital light processing (DLP) displays, and organic light-emitting diode (OLED) displays. The display 104 may further include a touch sensitive screen, such as a resistive touchscreen, capacitive touchscreen, or infrared touchscreen.

Figure 2:
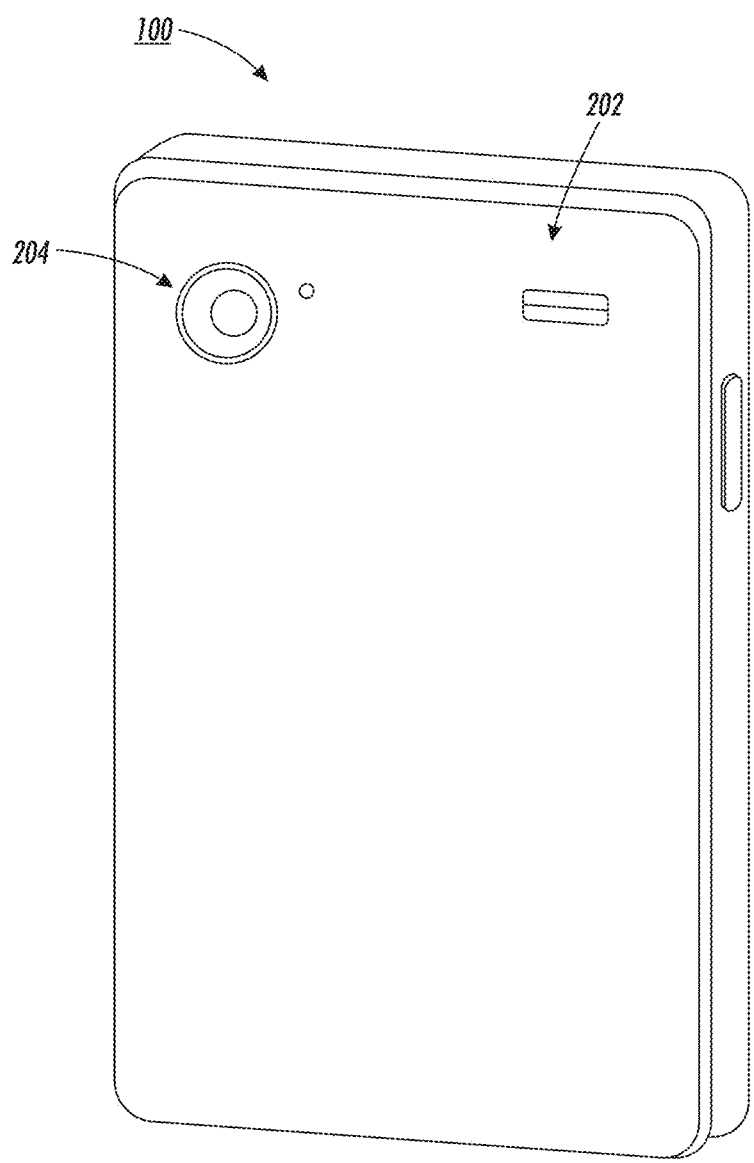
FIG. 2 depicts a second or rear face of a mobile device that includes a camera configured to capture an image according to an embodiment.

FIG. 2 shows a rear face 202 of the mobile device 100. The rear face 202 may include a lens for an imaging device 204. The imaging device 204 may be any suitable component capable of receiving an optical image and transmitting the information to other components for processing. The imaging device may also have an ability to adjust its focal length and aperture in such a manner that would allow it to zoom and properly focus upon an intended object to be imaged. This adjustment may define an "optimal focal distance," or a range of distances in which the mobile device 100 may be properly positioned from the intended object to be imaged to achieve a clear image.

While the imaging device 204 is depicted on the rear face of the present example, persons skilled in the art will appreciate that the imaging device 204 may be positioned at any location upon any face of the mobile device 100, or may even be external to the mobile device 100 and connected by any means of electronic communication, including, but not limited to, physical cable communication such as universal serial bus (USB), wireless radio communication, wireless light communication, or near field communication technology.

In some embodiments, the display 104 may be positioned within the mobile device 100, and it may be configured in such a way so as to display the output of the imaging device 204 in real time so that the user may view the display 104 and see the output of the imaging device 204 on the display. Accordingly, the configuration of the mobile device 100 as shown in FIGS. 1 and 2 is only an example, and persons skilled in the art will appreciate other configurations that are able to achieve a similar overall result.

Figure 3:
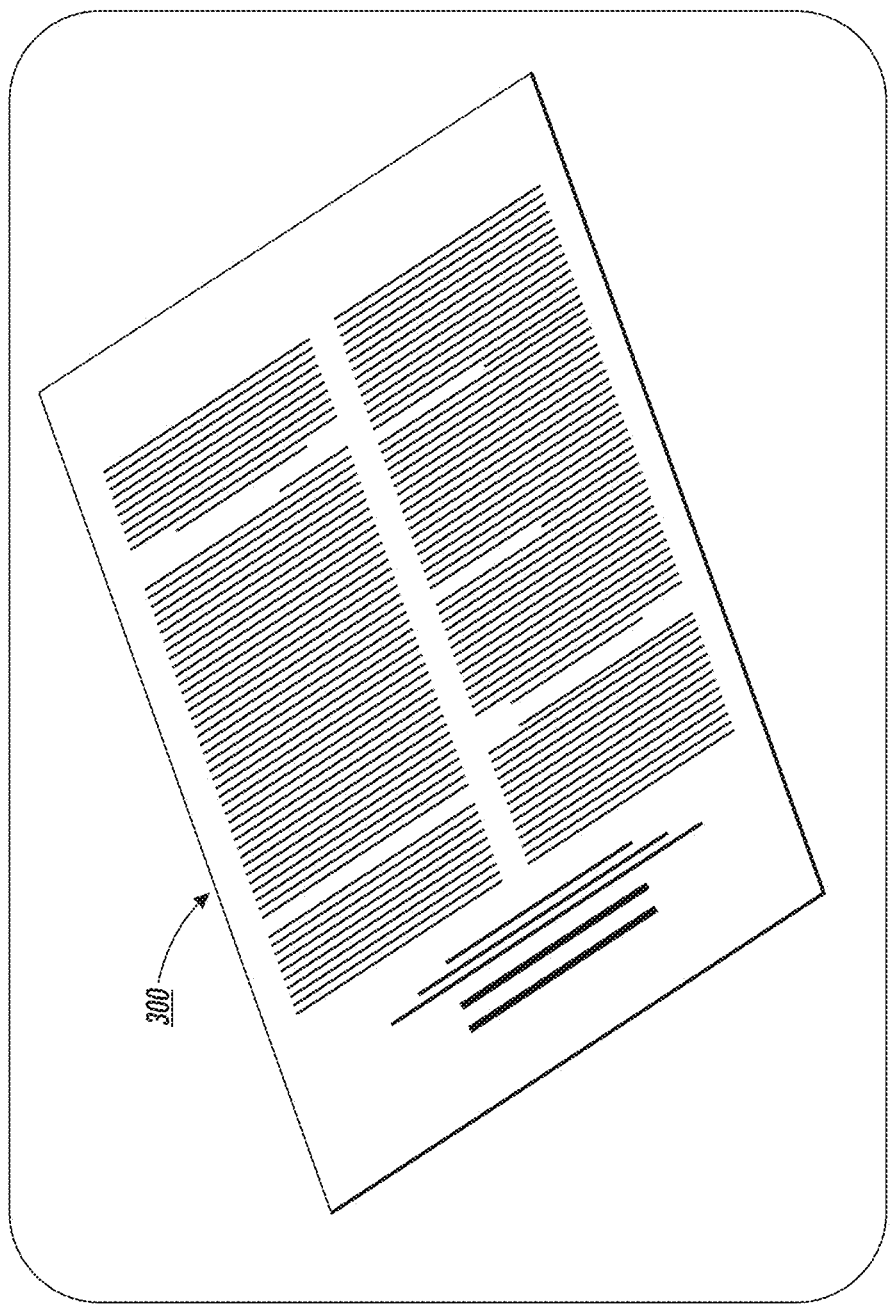
FIG. 3 depicts an example of a hard copy form to be imaged according to an embodiment.

FIG. 3 illustrates an example of a printed artifact that is a hard copy form 300. A user may use a mobile device to capture an image of the printed hard copy form 300. The printed hard copy form 300 may be placed on a flat (but not necessarily horizontal) surface as is shown in FIG. 3. The mobile device's imaging device may be activated to capture an image file of the form, and render an image of the form on the display of the mobile.

Figure 4:
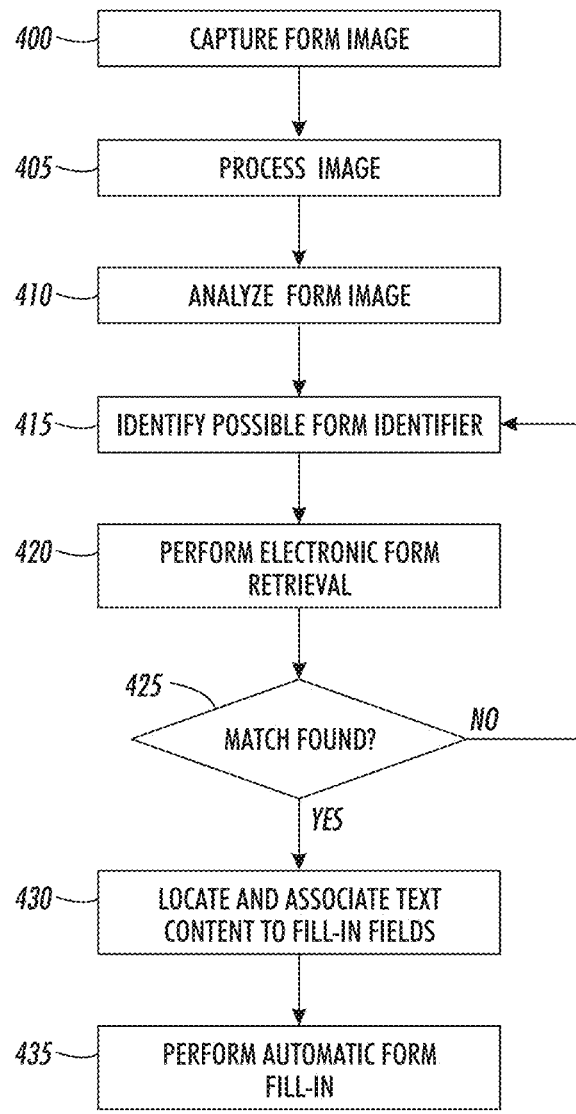
FIG. 4 depicts a flow chart example of a process for automated form fill-in of a mobile device camera captured form via form retrieval according to an embodiment.

FIG. 4 illustrates a sample process flow that a system may follow for capturing an image of a hard copy form and performing automated form fill-in via electronic form retrieval. A mobile electronic device's imaging device may capture an image of a hard copy form (step 400). The system may save the captured image to a non-transitory memory as an image file. Optionally, when capturing the image, programming instructions may cause the device processor to automatically cause the imaging device to adjust the image capture device settings for optimal focal distance and/or correction of inadequate lighting. This may help to improve the quality of the captured image. Example methods for capturing a high quality and clear document image are described in U.S. patent application Ser. No. 13/664,810, filed Oct. 31, 2012 by Bala et al., entitled "Mobile document capture assistance using augmented reality," the disclosure of which is herein incorporated by reference.

Figure 5A:
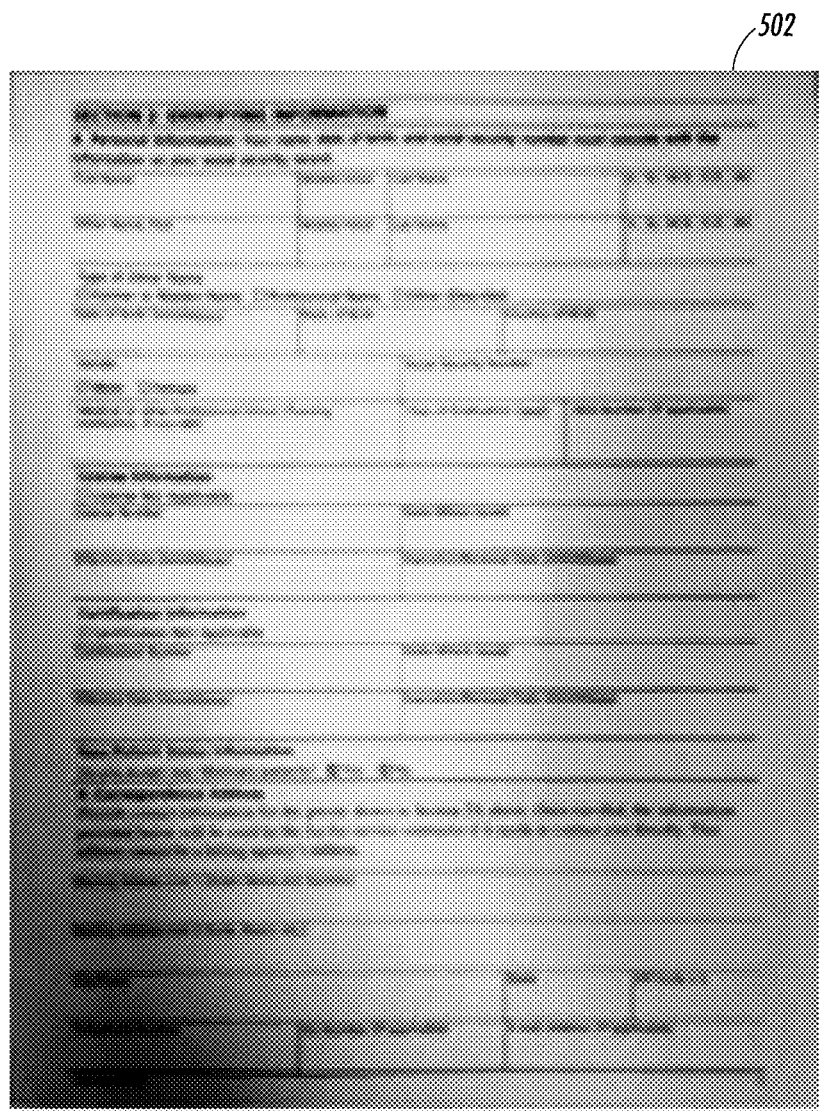
FIG. 5A depicts an example of a raw image of a hard copy form imaged by a mobile device camera according to an embodiment.

FIG. 5A depicts an example of a raw image 502 of a hard copy form captured by an imaging device according to an embodiment. If image quality improvement techniques are not employed during image capture, or in some cases even if such techniques are used as shown in FIG. 5A, the captured image 502 may still not be of sufficient quality for analysis, with variations in shading and blurring of text that will make it difficult to analyze the image and identify available input fields to be filled in with data. Thus, returning to FIG. 4, a processor of the mobile device and/or a remote processor that receives the image file from the electronic device may execute programming instructions that cause the associated processor to process the image to yield a high quality and clear image (step 405). For example, the system may process the captured image to align the image and/or correct other image capturing defects and external influences. Processing (step 405) operations on the captured image may include, for example, perspective correction, automatic cropping, image enhancement, skew and orientation adjustments, image binarization or other processing techniques to improve the resolution or clarity of an image. Any now or hereafter known image processing technique for the processes listed above may be used in this image processing step.

The system may store the resulting edited image as an output file in any suitable image format, such as PDF, PowerPoint, JPEG, TIFF, or other formats. The output file may be saved to a data storage facility, such as a memory of the mobile electronic device. Optionally, the image capture modules, data storage facility, and processor that performs the remaining steps may be part of the same mobile electronic device. In such an option, the processing may be performed as the image is captured into a data storage facility such as random access memory. Alternatively or additionally, the image capture module and/or data storage facility may be devices that are separate from the processor that performs the remaining steps, and the processor may perform its operations at a remote location that is in electronic communication with the electronic device.

FIG. 5B depicts an example of a processed image 506, and in particular the example of FIG. 5A after processing has occurred. Note that post processing operations greatly enhance the quality of the captured form image, but a perfect image need not be captured. Based upon the quality of the image capturing device, the capabilities of any software performing post image capture processing on the image and other factors, an acceptable tolerance may be determined and integrated into the above-discussed image capture process.

Returning again to FIG. 4, the system may then perform form image analysis (step 410) on the processed image to analyze the layout of the form and identify: (i) labels that may correspond to form identifiers; and (ii) fields where a user may enter data into the form. Form image analysis operations may include performing optical character recognition (OCR) or other similar recognition processes for identifying field names, lines, checkboxes, bounded or unbounded blank areas and other relevant information. OCR may be any conventional optical character recognition process such as that described in U.S. Pat. No. 6,396,951 to Grefenstette, the disclosure of which is incorporated by reference in its entirety.

The system may parse the information assembled from image analysis to detect and identify a partial or a complete form identifier (step 415). A form identifier may be an alphanumeric sequence that uniquely identifies a particular form. For example, a form identifier may be a title or part of a title of the form to be filled, an identification number, a form catalogue page number and/or any other identifier that may uniquely identify a form.

The system may parse the OCR information using string content (alphanumeric) search methods to detect a potential form identifier. Any now or hereafter known search technique may be used in this step. Alternatively or additionally, the system may access a local or remote database for retrieving spatial information including common known locations of a desired form identifier on hard copy forms. The spatial information retrieved may be used to locate a form identifier on an imaged hard copy form by querying and analyzing the OCR information retrieved from known form identifier locations. For example, a form identification number may commonly be found at the bottom right corner, bottom left corner, top right corner or (in the case of a title) a top center of a form. In addition to location, the spatial information may include data such as font size. For example, a title may appear in a font size that is larger than that of the other text on the form, while a form ID that is in a form's header or footer may appear in a font size that is smaller than that of the other text on the form. In some embodiments, string content search and spatial information may be used together to detect a potential form identifier. The system may do this by looking for character strings in specified areas of the form that do not match known words, which match known form IDs, or which follow a certain format (such as two or more letters followed by two or more numbers).

The system may then perform an electronic form retrieval (step 420) by automatically using the recognized character string in a query of a local and/or remote database of reference form identifiers, or a Web search of published forms, to determine if the character string of the potential form identifier corresponds to a unique actual form identifier.

If the system identifies that potential form identifier corresponds to the actual form identifier (step 425), it may automatically retrieve a copy of the actual form from the database or Web location where the actual form is available. When performing form retrieval (step 420) the potential form identifier may not necessarily match the exact form ID. For example, image quality may cause minor errors in the OCR analysis of the potential form identifier. One or more characters may be missing, unreadable, or incorrectly analyzed. As an example, the system may capture an image of a Medicaid form CMS-8551 (7/11). However, the analysis may only identify the potential form identifier as CMS-855 (7/11)—in which case the number "1" after the CMS-855 was missing. If so, then when searching the database and/or the Web, the system may search for exact matches and potential matches. Any suitable rules may be used to identify a potential match. For example, if the system determines that all but one of the characters match in both value and position, or that at least a threshold number or percentage of the characters match in number, position or sequential order, then the system may determine that the potential form identifier corresponds to the actual form identifier. If the system performs a Web search, then it may consider a suitable match to be the highest order returned result, or a particular number of the highest order results, according to ranking rules of the search engine that is used.

Optionally, if the system identifies two or more forms that are potential matches, it may retrieve each potential match and compare one or more additional characteristics of the potential match to the analyzed processed image to determine which of the potential matches has characteristics that match those of the processed image. If so, the system may remove as a potential match any form that does not have the additional characteristics of the processed image. As an additional option, the system may present a user with two or more potential matches and permit the user to select which of the potential matches is the actual form. As an additional option, in the case of a Web search using a commercially available search engine, the system may rely on the analysis of the search engine and use the first returned potential match (or the first returned potential match that is not a commercially sponsored search result). Additional validation options will be discussed below in the context of FIG. 6.

Figure 6:
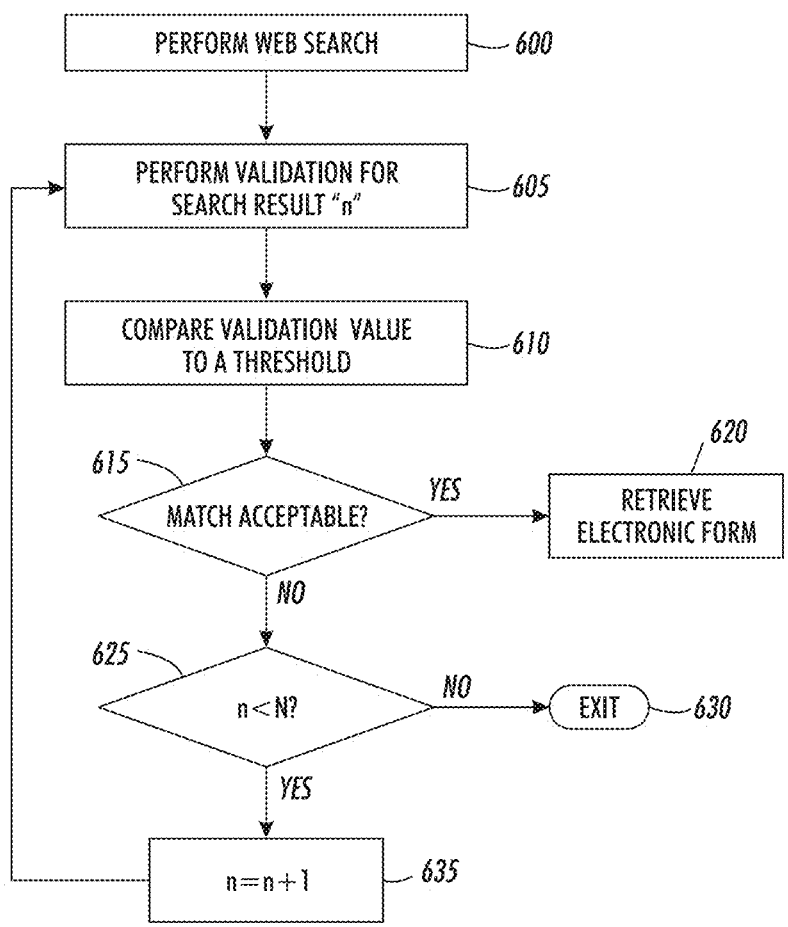
FIG. 6 depicts a flow chart example of a process for retrieving an electronic form corresponding to an imaged hard copy form.

FIG. 6 depicts a sample process flow for using a Web search to retrieving an electronic form corresponding to an imaged hard copy. First, the system may initiate a Web search (step 600) using all or part of the detected potential form ID character string as at least a portion of a search query to retrieve an electronic form. A known modifier may be added to the string before running the Web search for increasing the probability of getting a match. The modifier may be known by being predetermined, by being specified by a user, by being contained on the form itself, or by other suitable methods. The Web search may be done via any proprietary and/or commercially available search engine.

The system may then perform a validation step 605 for at least a portion of the search results by reviewing a group of the returned documents, starting at the top of the search result list (i.e., the most probable result) and/or proceeding in any suitable sequence. The system may sequentially validate the group of the returned forms using any suitable process. For example, the system may use a form alignment algorithm for performing validation. The form alignment algorithm may be any suitable form alignment algorithm process such as those described in U.S. Pat. No. 6,868,411 to Shanahan, the entirety of which is incorporated by reference, as well as other scale-invariant pattern-matching algorithms.

Figure 7:
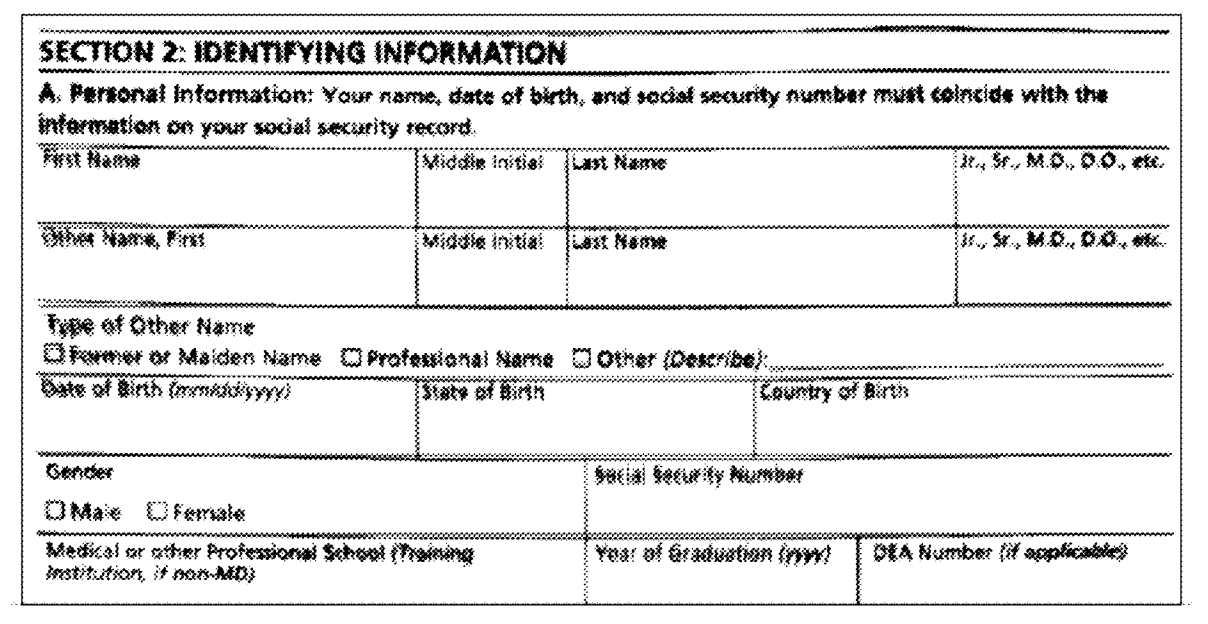

For example, the system may use each retrieved candidate electronic form as a reference image, along with a camera-captured image of a hard copy form, and overlay a portion of each candidate form on a corresponding portion of the captured image (or vice versa) to determine which combination of a candidate form and the captured image most closely aligns with the least distortion. An example of this is shown in FIG. 7, in which a section of a candidate form is overlaid with a corresponding section of a captured image, and only a minimal amount of distortion appears. Any now or hereafter known techniques may be used to obtain the best paper distortion of the camera captured image. Furthermore, the system may create a match (i.e., align the images) by maintaining allowed transformation of neighborhood relationships, excluding local inversions and/or applying other desired constraints. The constraints may be determined by examining the physical properties of a hard copy form and/or quality of the camera captured and processed images of the hard copy form. The system may then use positions of corresponding control points in the reference and distorted images to determine a matching model that would register the images by mapping corresponding control points in the images exactly on top of each other, and map other points in the images by interpolation. The mapping model may be sensitive to the distortion between the reference image and the distorted image, and may be used by the system to determine the magnitude of distortion. In an embodiment, the system may use the match created in a polynomial matching model, and the match confidence may be determined by examining the polynomial matching model and its coefficients. It should be noted that the constraints and polynomial matching model described above are by way of example only. Additional constraints and matching models may be used. The results of this analysis may result in the system assigning a number to each candidate form. Use of this number will be described below.

Alternatively or additionally, the system may use image differencing techniques now or hereafter known for performing validation. For example, the system may perform subtraction of a reference electronic form image and camera captured image of a hard copy form, and create a histogram to measure a number of difference pixels. The number of difference pixels may be an indication of a match. It should be noted that the form alignment and image differencing methods for performing validation are used by way of example only. Additional known methods for performing validation may be used.

In an embodiment, the system may perform validation using any or all of the aforementioned methods. In some embodiments, validation may be performed using a retrieved electronic form and the raw camera captured image of a hard copy form. In certain other embodiments, validation may be performed using a retrieved electronic form and a processed image of a hard copy form.

Returning to FIG. 6, the system may compare the validation result values against a threshold (step 610) to determine if there is an acceptable match (step 615) between the image of the printed form and a candidate electronic form returned in the search results. In an embodiment, the threshold value may depend on the validation method used. For example, if a form alignment algorithm is used for generating a polynomial matching model, the polynomial coefficients may determine the preset threshold value. In another example, if an image subtraction model is used for validation, the preset threshold value may depend on the number of difference pixels (typically, the larger the number of difference pixels, the less likely electronic form from the search result is a match to the imaged hard copy form).

If the system determines (step 615) that there is an acceptable match, then it may retrieve (step 620) an electronic form corresponding to the search result form and store it in a database and/or present it to the user. In this step, "retrieving" may refer to retrieving the form from a permanent memory (e.g., a database) or external source (e.g., a Web search), or to simply accessing it from a local memory (such as a cache) if the form was already obtained from another location. However, if the system determines that the electronic form is an unacceptable match, it may then determine (step 625) whether the number assigned to the last search result on which validation was performed is less than a predetermined number "N." If the number assigned to the last search result on which validation was performed is determined to be less than N, the system may perform validation on the next search result (step 635) on the search result list. The validation step may be repeated until validation is performed on N search results. N may be a preset number, assigned by a user or another portion of the system, and/or based on any other inputs.

In some embodiments, if it is determined that an acceptable match was not found for N search results, the system may repeat the web search 600 again using a variant of the character string that was the potential form identifier. In certain other embodiments, the process may be terminated (step 630) and the user may be informed that a suitable form was not found.

Returning to FIG. 4, in other embodiments, after performing electronic form retrieval (step 420) and analyzing the retrieved documents for a match (step 425), if the system does not find a match, the system may again assess the document for a second possible form identifier (step 415) using any or all of the aforementioned methods. The system may repeat steps 415 to 425 until it retrieves an electronic form that it determines is a match for the image. In another embodiment, the system may repeat steps 415 to 425 process for a preset number of times and if an electronic form is not retrieved, the system may generate an indication of an inability to retrieve an electronic form and display that indication to a user. In some embodiments, the system may optionally prompt a user to retrieve an electronic form manually.

Figure 8:
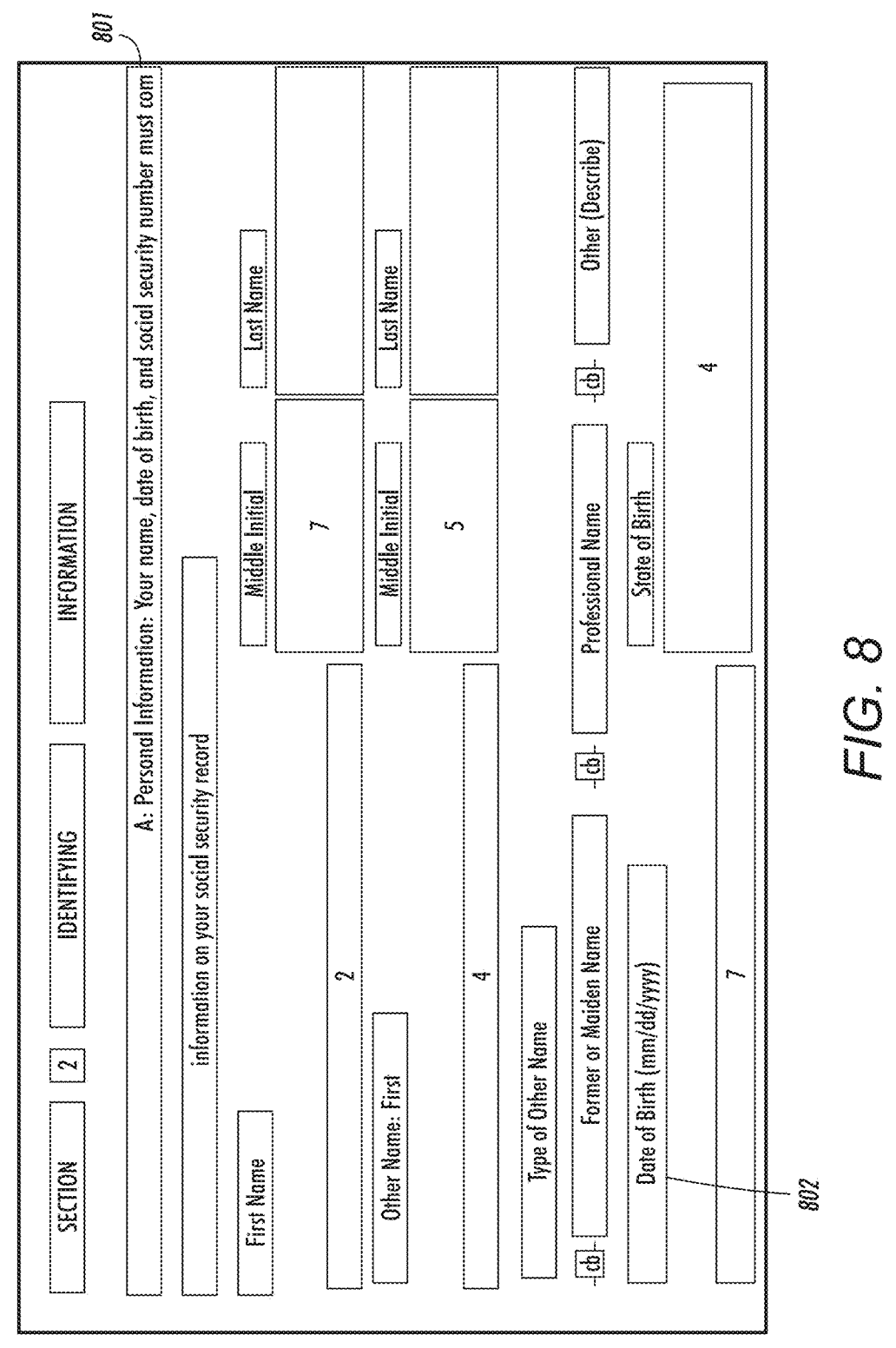

If the system identifies a match, the system may then proceed to locate and associate text content with fields of the retrieved form (step 430). Typically, the system will do this using the retrieved form, as the form may already include metadata that identifies fill-in fields and labels for each field. Alternatively, the system may analyze the electronic form to identify data fields and associated form content. The system may do this by performing any or all of the following: extracting a layout from the form image, defining form fields, associating form fields with data fields, and producing form definitions. The system may use optical character recognition (OCR) or other similar recognition algorithms and/or template matching techniques for identifying form layout, field names, lines, checkboxes, blank areas for entering information, and other relevant information. FIG. 8 illustrates an example of a portion of a form 801 showing multiple identified data fields 802, and labels that the system applies to those fields. Each label is corresponds to a data category or is otherwise descriptive of the type of data that will be filled into the field. Examples of labels include "first name," "Social Security number," "date of birth," "state of birth" and other information.

Returning to FIG. 4, the system may then use the field labels to identify appropriate text content to add to the fill-in fields (step 435) to yield an automatically filled-in form. The form may not be entirely complete, but it may include some of the information for which field labels and corresponding data was available. It may do this by prompting the user to add data, by retrieving data that is stored in a computer-readable memory (such as in a wallet or database of user data) along with one or more labels, or by other suitable means.

In an embodiment, the system may optionally prompt a user to verify the text that the system associated with the fill-in fields. If the user finds a discrepancy, the user may be allowed to manually correct the errors. The system may use any now or hereafter known techniques for automatic form filling using stored user data such those described above to fill in data fields such as a name, date of birth, or other data.

Figure 9:
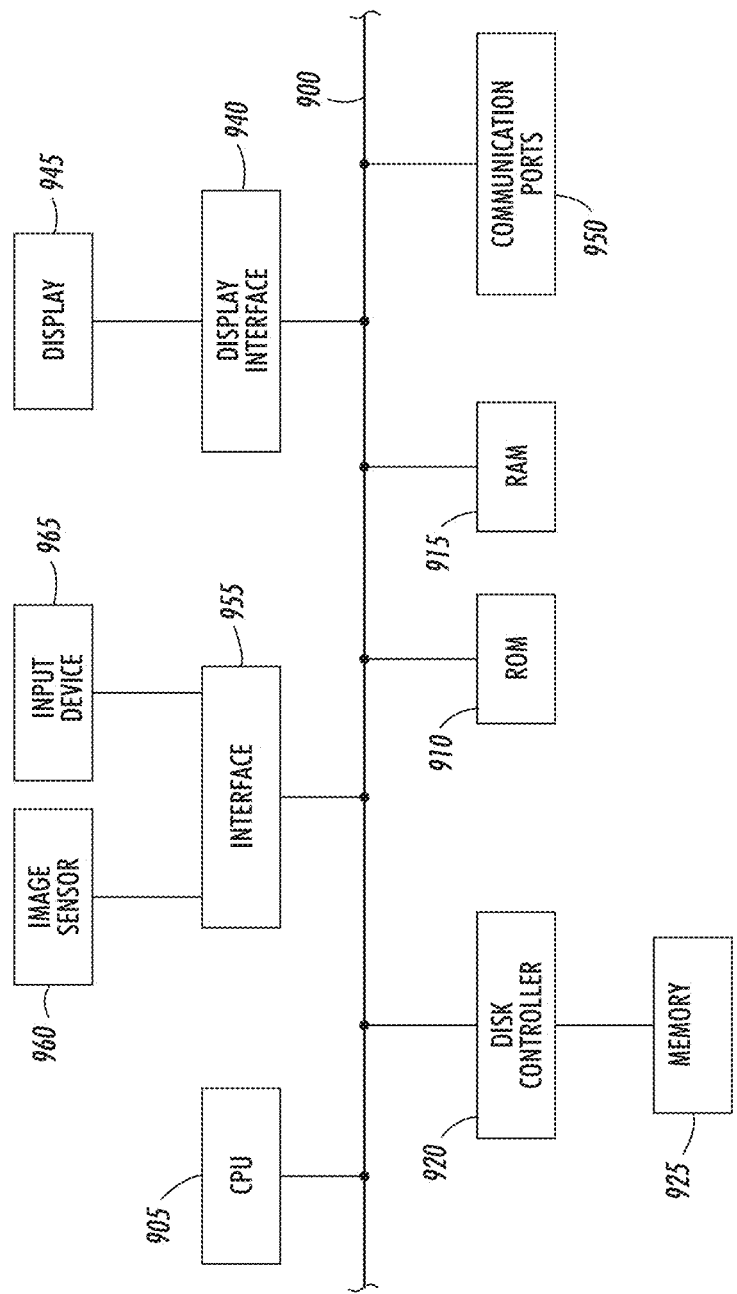
FIG. 9 depicts various embodiments of a computing device for implementing the various methods and processes described herein.

The automated form fill-in method and process as described above may be performed and implemented by an operator of a mobile electronic device having a video camera or other imaging device. FIG. 9 depicts an example of internal hardware that may be used to contain or implement the various computer processes and systems as discussed above. For example, the mobile electronic device discussed above may include hardware such as that illustrated in FIG. 9. An electrical bus 900 serves as an information highway interconnecting the other illustrated components of the hardware. CPU 905 is a central processing unit of the system, performing calculations and logic operations required to execute a program. CPU 905, alone or in conjunction with one or more of the other elements, is a processing device, computing device or processor as such terms are used within this disclosure. As used in this document and in the claims, the term "processor" may refer to a single processor or any number of processors in a set of processors. Read only memory (ROM) 910 and random access memory (RAM) 915 constitute examples of memory devices.

A controller 920 interfaces with one or more optional memory devices 925 that service as date storage facilities to the system bus 900. These memory devices 925 may include, for example, an external or internal disk drive, a hard drive, flash memory, a USB drive or another type of device that serves as a data storage facility. As indicated previously, these various drives and controllers are optional devices. Additionally, the memory devices 925 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 910 and/or the RAM 915. Optionally, the program instructions may be stored on a non-transitory, computer readable medium such as a compact disk, a digital disk, flash memory, a memory card, a USB drive, an optical disc storage medium, and/or other recording medium.

An optional display interface 940 may permit information from the bus 900 to be displayed on the display 945 in audio, visual, graphic or alphanumeric format. Communication with external devices may occur using various communication ports 950. A communication port 950 may be attached to a communications network, such as the Internet, a local area network or a cellular telephone data network.

The hardware may also include an interface 955 which allows for receipt of data from input devices such as an imaging sensor 960 of a scanner or other input device 965 such as a keyboard, a mouse, a joystick, a touchscreen, a remote control, a pointing device, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method of creating an electronic file corresponding to a printed artifact, the method comprising, by a processor:
   receiving an image file of a printed form;
   analyzing the image file to detect a potential form identifier on the printed form; and
   automatically and without human intervention:
      performing a search to identify an actual form that corresponds to the potential form identifier,
      comparing the image file with the actual form to validate whether the image file is of a document page that corresponds to the actual form by:
         using the actual form as a reference image,
         overlaying a portion of the reference image on a corresponding portion of the image file to determine a validation value by using a polynomial matching model, and
         determining whether the image file is of the document page that corresponds to the actual form by comparing the validation value against a threshold, and
      upon validating that the image file is of the document page that corresponds to the actual form, locating a probable fill-in field on the document page, and mapping the probable fill-in field to an actual fill-in field of the actual form;
   determining information to include in the probable fill-in field;
   adding the information to the probable fill-field; and
   saving the document page with the added information to a data file.

2. The method of claim 1, further comprising, by the processor:
   extracting information from the mapped fill-in field;
   determining a label for the actual fill-in field; and
   saving the extracted information in association with the label to the data file.

3. The method of claim 1, further comprising, by the processor:
   determining a label for the actual fill-in field; and
   assigning the determined label to the probable fill-in field.

4. The method of claim 3, further comprising, by the processor: using the label to retrieve the information to include in the probable fill-in field.

5. The method of claim 1, further comprising, before the analyzing, processing the image file to enhance a quality of an image in the image file.

6. The method of claim 1, wherein detecting the potential form identifier comprises performing one or more of the following:
   analyzing the document to locate a character string of a predetermined format; or
   analyzing the document to locate a character string that is in a position of a probable form identifier location.

7. The method of claim 1, wherein validating whether the image file is of a document page that corresponds to the actual form comprises performing image subtraction using the actual form and the image file to measure a number of difference pixels and yield a validation value.

8. The method of claim 1, wherein validating whether the image file is of a document page that corresponds to the actual form comprises:
   performing image subtraction using the actual form and the image file to measure a number of difference pixels and yield a validation value; and
   comparing the validation value against a threshold value.

9. The method of claim 1, wherein the validating determines that the image file is not of a document that corresponds to the actual form, and the method further comprises:
   analyzing the image file to detect a second potential form identifier on the printed form; and
   automatically and without human intervention:
      performing a search to identify a second actual form that corresponds to the potential form identifier, and
      validating that the image file is of a document page that corresponds to the second actual form;
   wherein the mapping comprises mapping the probable fill-in field to an actual fill-in field of the second actual form.

10. A mobile electronic device comprising:
   an imaging device;
   a processor; and
   a computer-readable medium containing programming instructions that, when executed by the processor, cause the processor to:
      receive an image file of a printed form;
      analyze the image file to detect a potential form identifier on the document page;
      automatically and without human intervention:
         perform a search to identify an actual form that corresponds to the potential form identifier,
         compare the image file with the actual form to validate whether the image file is of a document page that corresponds to the actual form by:
            using the actual form as a reference image,
            overlaying a portion of the reference image on a corresponding portion of the image file to determine a validation value by using a polynomial matching model, and determining whether the image file is of the document page that corresponds to the actual form by comparing the validation value against a threshold,
         locate a probable fill-in field on the document page, and
         map the probable fill-in field to an actual fill-in field of the actual form;
      determine information to include in the probable fill-in field;
      add the information to the probable fill-in field; and
      save the document page with the added information to a data file.

11. The device of claim 10, further comprising additional programming instructions that, when executed, cause the processor to:
   extract information from the mapped fill-in field;
   determine a label for the actual fill-in field; and
   save the extracted information in association with the label to the data file.

12. The device of claim 10, further comprising additional programming instructions that, when executed, cause the processor to:
   determine a label for the actual fill-in field; and
   assign the determined label to the probable fill-in field.

13. The device of claim 12, further comprising additional programming instructions that, when executed, cause the processor to:
   use the label to retrieve the information to include in the probable fill-in field.

14. The device of claim 10, further comprising additional programming instructions that, when executed, cause the processor to process the image file to enhance a quality of an image in the image file before detecting the potential form identifier.

15. The device of claim 10, wherein the instructions to analyze the image file to detect the potential form identifier comprise instructions to perform one or more of the following:
   analyze the document to locate a character string of a predetermined format; or
   analyze the document to locate a character string that is in a position of a probable form identifier location.

16. The device of claim 10, wherein the instructions to validate that the image file is of a document page that corresponds to the actual form comprise instructions to perform image subtraction using the actual form and the image file to measure a number of difference pixels and yield a validation value.

17. The device of claim 11, wherein the instructions to validate that the image file is of a document page that corresponds to the actual form comprise instructions that, when executed, cause the processor to:
   perform image subtraction using the actual form and the image file to measure a number of difference pixels and yield a validation value; and
   compare the validation value against a threshold value.

18. The device of claim 10, further comprising additional programming instructions that, when executed, cause the processor to, if the validating determines that the image file is not of a document that corresponds to the actual form:
   analyze the image file to detect a second potential form identifier on the printed form;
   automatically and without human intervention:
      perform a search to identify a second actual form that corresponds to the potential form identifier, and
      validate that the image file is of a document page that corresponds to the second actual form; and
   when mapping the probable fill-in field to an actual fill-in field, use an actual fill-in field of the second actual form.

19. A method of creating an electronic file corresponding to a printed artifact, the method comprising, by a processor:
   receiving an image file of a printed form;
   processing the image file to enhance a quality of an image in the image file;
   analyzing the image file to detect a potential form identifier on the printed form, wherein the potential form identifier comprises at least a portion of a title or a form catalogue page number that uniquely identifies a form;

automatically and without human intervention:
performing a search to identify an actual form that corresponds to the potential form identifier;
validating whether the image file is of a document page that corresponds to the actual form polynomial matching model, wherein validating further comprises:
using the actual form as a reference image,
overlaying a portion of the reference image on a corresponding portion of the image file to determine a validation value,
determining whether the image file is of the document page that corresponds to the actual form by comparing the validation value against a threshold, wherein the threshold is based on one or more coefficients of the polynomial matching model; and
upon validating that the image file is of a document page that corresponds to the actual form, locating a probable fill-in field on the document page, and mapping the probable fill-in field to an actual fill-in field of the actual form;
determining information to include in the probable fill-in field;
adding the information to the probable fill-in field; and
saving the document page with the added information to a data file.

20. The method of claim 19, further comprising, by the processor:
determining a label for the actual fill-in field;
assigning the determined label to the probable fill-in field;
using the label to retrieve the information to include in the probable fill-in field.

21. The method of claim 1, wherein the threshold against which the validation value is compared is based on one or more coefficients of the polynomial matching model.

22. The device of claim 10, wherein the threshold against which the validation value is compared is based on one or more coefficients of the polynomial matching model.

* * * * *